(12) United States Patent
Bell

(10) Patent No.: US 9,866,044 B1
(45) Date of Patent: Jan. 9, 2018

(54) COMBINED VEHICLE AND STANDARD ELECTRICAL OUTLET CHARGER

(71) Applicant: Paulette Bell, Mesquite, TX (US)

(72) Inventor: Paulette Bell, Mesquite, TX (US)

( * ) Notice: Subject to any disclaimer, the term of this patent is extended or adjusted under 35 U.S.C. 154(b) by 125 days.

(21) Appl. No.: 14/962,018

(22) Filed: Dec. 8, 2015

(51) Int. Cl.
*H02J 7/00* (2006.01)

(52) U.S. Cl.
CPC .......... *H02J 7/0042* (2013.01); *H02J 7/0052* (2013.01); *H02J 2007/0062* (2013.01)

(58) Field of Classification Search
CPC ....... Y02E 60/12; H02J 7/0042; H02J 7/0045; H02J 7/0052; H02J 2007/0062; H01M 10/44; H01M 10/46
USPC ....................................................... 320/107
See application file for complete search history.

(56) References Cited

U.S. PATENT DOCUMENTS

| 4,321,523 | A | * | 3/1982 | Hammel | ................. | H02J 7/008 |
| | | | | | | 320/139 |
| 5,829,993 | A | | 11/1998 | Wu | | |
| 5,847,545 | A | * | 12/1998 | Chen | ...................... | H01R 29/00 |
| | | | | | | 307/18 |
| 5,901,056 | A | | 4/1999 | Hung | | |
| 6,211,649 | B1 | * | 4/2001 | Matsuda | ................. | G06F 1/266 |
| | | | | | | 320/115 |
| D486,788 | S | | 2/2004 | Riede | | |
| 6,956,353 | B1 | | 10/2005 | Klitzner | | |
| 7,011,538 | B2 | * | 3/2006 | Chang | ................... | H01R 13/60 |
| | | | | | | 439/172 |
| 2003/0042867 | A1 | * | 3/2003 | Chang | ................... | H02J 7/0055 |
| | | | | | | 320/107 |
| 2003/0117104 | A1 | * | 6/2003 | Liao | ....................... | H02J 7/0042 |
| | | | | | | 320/107 |
| 2004/0036442 | A1 | | 2/2004 | Wu | | |
| 2004/0145343 | A1 | * | 7/2004 | Naskali | ................. | H02J 7/0027 |
| | | | | | | 320/108 |
| 2005/0017766 | A1 | * | 1/2005 | Formenti | ................ | G06F 1/263 |
| | | | | | | 327/110 |
| 2005/0189911 | A1 | | 9/2005 | Cheng | | |
| 2008/0284371 | A1 | * | 11/2008 | Hsu | ....................... | H01M 10/44 |
| | | | | | | 320/111 |
| 2011/0084660 | A1 | * | 4/2011 | McSweyn | ......... | H01R 13/6675 |
| | | | | | | 320/111 |
| 2013/0002259 | A1 | * | 1/2013 | Cheng | ................... | G01R 31/362 |
| | | | | | | 324/426 |
| 2013/0328526 | A1 | * | 12/2013 | Levy | .................... | H01R 31/065 |
| | | | | | | 320/109 |
| 2014/0335919 | A1 | * | 11/2014 | Stewart | ................. | H02J 7/0042 |
| | | | | | | 455/573 |

FOREIGN PATENT DOCUMENTS

CN          202817804          3/2013

* cited by examiner

*Primary Examiner* — Yalkew Fantu
*Assistant Examiner* — Mohammed J Sharief

(57) ABSTRACT

The combined vehicle and standard electrical outlet charger is a device that is adapted to receive power from multiple power sources to power a plurality of USB ports for use in charging electronic devices. The combined vehicle and standard electrical outlet charger is specifically adapted to draw power either from the national power grid or a standard 12 Vdc electrical system and is capable of powering a plurality of USB ports with 5 volts of power at 2.0 amps each. The combined vehicle and standard electrical outlet charger comprises a car adapter plug, a NEMA 1 plug, a housing, and charging circuitry.

9 Claims, 4 Drawing Sheets

COMBINED VEHICLE AND STANDARD ELECTRICAL OUTLET CHARGER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of battery chargers and battery charger design, more specifically, a battery charger adapted for use as a wall or car charger

SUMMARY OF INVENTION

The combined vehicle and standard electrical outlet charger is a device that is adapted to receive power from multiple power sources to power a plurality of USB ports for use in charging standard electronic devices. The combined vehicle and standard electrical outlet charger is specifically adapted to draw power either from the national power grid or a standard 12 VDC electrical system and is capable of powering a plurality of USB ports with 5 volts of power at 2.0 amps each.

These together with additional objects, features and advantages of the combined vehicle and standard electrical outlet charger will be readily apparent to those of ordinary skill in the art upon reading the following detailed description of the presently preferred, but nonetheless illustrative, embodiments when taken in conjunction with the accompanying drawings.

In this respect, before explaining the current embodiments of the combined vehicle and standard electrical outlet charger in detail, it is to be understood that the combined vehicle and standard electrical outlet charger is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the combined vehicle and standard electrical outlet charger.

It is therefore important that the claims be regarded as including such equivalent construction insofar as they do not depart from the spirit and scope of the combined vehicle and standard electrical outlet charger. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
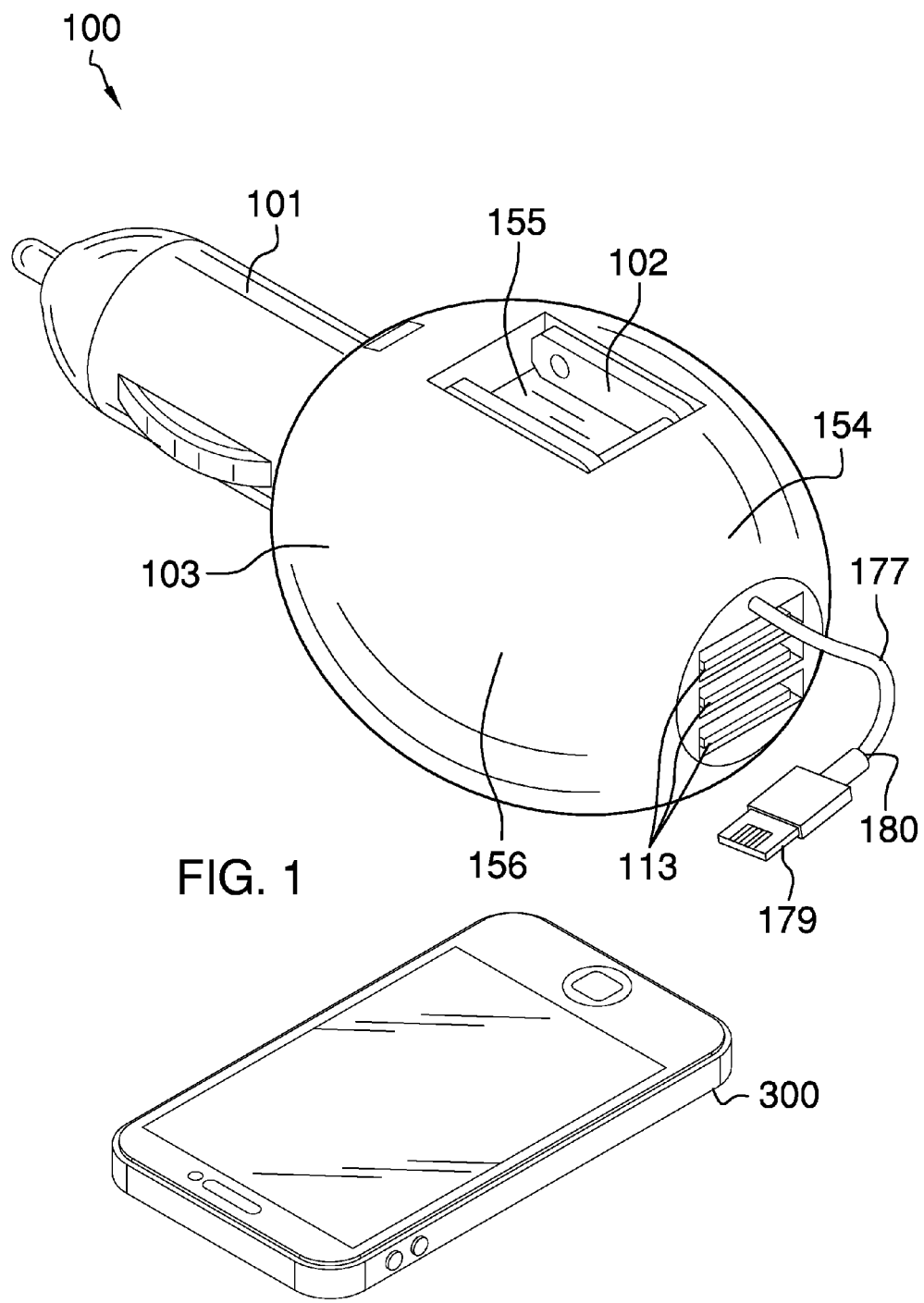
FIG. 1 is a front perspective view of an embodiment of the disclosure.
Figure 2:
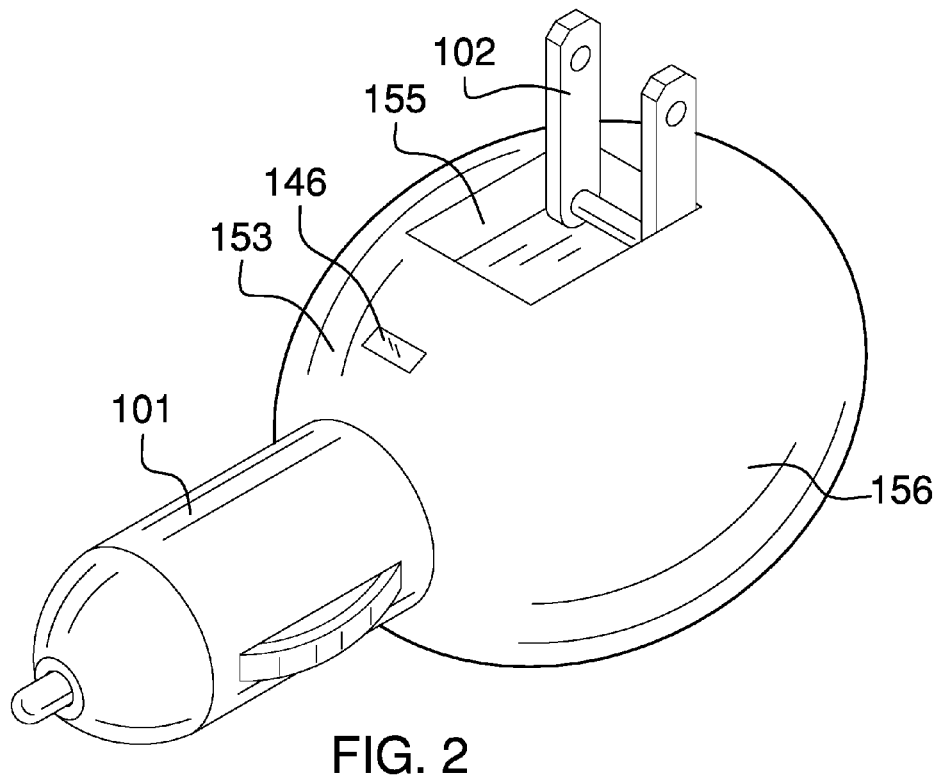
FIG. 2 is a rear perspective view of an embodiment of the disclosure.
Figure 3:
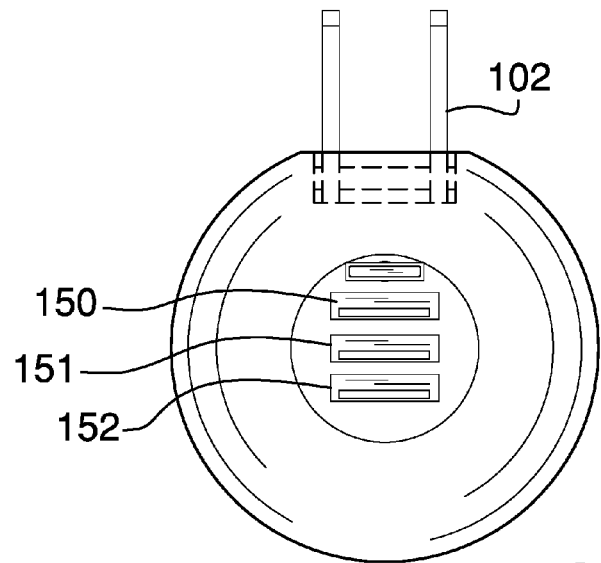
FIG. 3 is a side view of an embodiment of the disclosure.
Figure 4:
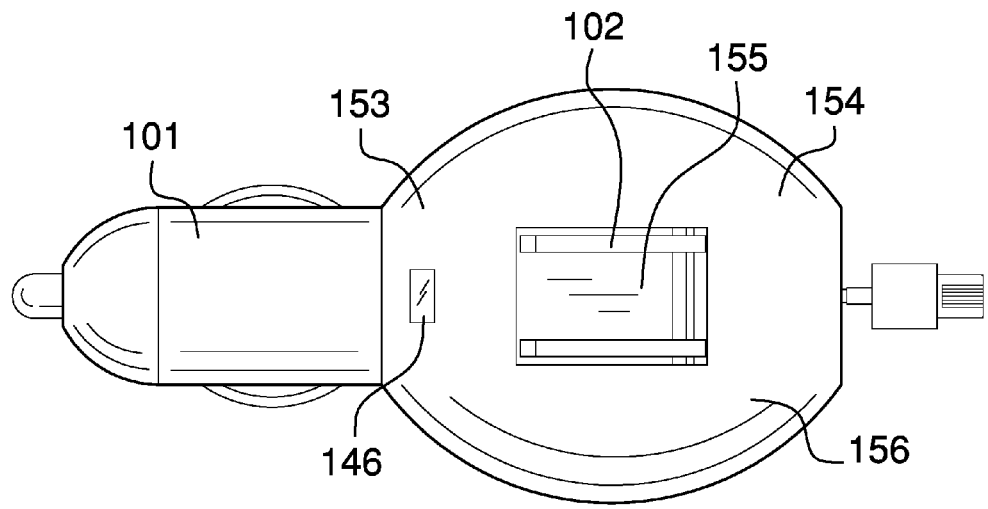
FIG. 4 is a top view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 6. The combined vehicle and standard electrical outlet charger 100 (hereinafter invention) comprises a car adapter plug 101, a NEMA 1 plug 102, a housing 103, and charging circuitry 104. The charging circuitry 104 is designed to provide electrical power to electronic devices through a plurality of USB ports 113 at a power rate of 10 watts (2 amps @ 5 volts dc).

The housing 103 is a rigid casing that has the car adapter plug 101, the NEMA 1 plug 102, and the plurality of USB ports 113 mounted on it and has the charging circuitry 104 installed within it. The housing 103 is formed in a sixteenth egg shape 156 with a thirteenth end 153, a fourteenth end 154 and a fifteenth cavity 155. The car adapter plug 101 is positioned at the thirteenth end 153 of the sixteenth egg shape 156. The plurality of USB ports 113 are positioned at the fourteenth end 154 of the sixteenth egg shape 156. The fifteenth cavity 155 is formed to receive the NEMA 1 plug 102. The NEMA 1 plug 102 is hinged such that it will fold into and fit within the fifteenth cavity 155 when the NEMA 1 plug 102 is not in use. When in use, the NEMA 1 plug 102 will swing away from the body of the sixteenth egg shape 156 so that the NEMA 1 plug 102 can be plugged into the appropriate outlet. Methods to hinge a NEMA 1 plug 102 such that it will fold into and swing out of housings are well known and documented in the art.

The car adapter plug 101 is a device that plugs into the cigarette lighter receptacle of an automobile allowing the car adapter plug 101 to draw power from the automobile's electrical system 131. Car adapter plugs 101 are commercially available. The NEMA 1 plug 102 is a 2 blade plug that is used to access power from the national electrical grids 132 of the United States, Canada, Mexico and most Central American and Caribbean countries. NEMA 1 plugs are commercially available. The sixteenth egg shape 156, and optionally the shell of the car adapter plug 101, can be formed from molded plastic. Suitable plastics include, but are not limited to, polycarbonate.

The charging circuitry 104 comprises an AC power conditioner 111, a plurality of DC to DC converters 112, and a plurality of USB ports 113. The purpose of the AC power conditioner 111 is to convert the power from the national electrical grid 132 to a second 12 Vdc power source. The automobile's electrical system 131 is then isolated from the second 12 Vdc power source using the fourth diode 144 and the fifth diode 145. Both the automobile's electrical system 131 and the second 12 Vdc source are used to drive the plurality of DC to DC converters 112 which are used to power the plurality of USB ports 113.

The AC power conditioner 111 comprises a full wave rectifier 114, a first resistor 141, a second capacitor 142 and a third Zener diode 143. The purpose of the full wave rectifier 114 is to convert the alternating current of the national electrical grid 132 to a direct current that flows in only one direction. The purpose of the first resistor 141 is to limit current flow through the second capacitor 142 and the third Zener diode 143 during charging and operation. The purpose of the second capacitor 142 is to smooth the fluctuations of the voltage and current output from the full wave rectifier 114. The purpose of the third Zener diode 143 is to limit the voltage output of the AC power conditioner 111 to 12 Vdc. The purpose of the fourth diode 144 is to prevent the flow of current from the automobile electrical system 131 into the AC power conditioner 111. The purpose of the fifth diode 145 is to prevent the flow of current from the AC power conditioner 111 into the automobile electrical system 131.

Both 12 Vdc power source are then connected to each of the plurality of DC to DC converters 112. The return current flow from the plurality of DC to DC converters 112 is returned to ground 133. Each of the plurality of DC to DC converters 112 converts 12 Vdc power to 5 Vdc power. Each of the plurality of DC to DC converters 112 is used to provide 5 Vdc 2A power to each USB port selected from the plurality of USB ports 113.

In the first potential embodiment of the disclosure, the plurality of DC to DC converters 112 further comprises a seventh DC to DC converter 147, an eighth DC to DC converter 148, and a ninth DC to DC converter 149. The plurality of USB ports 113 further comprises a tenth USB port 150, an eleventh USB port 151, and a twelfth USB port 152. The seventh DC to DC converter 147 is used to power the tenth USB port 150. The eighth DC to DC converter 148 is used to power the eleventh USB port 151. The ninth DC to DC converter 149 is used to power the twelfth USB port 152.

A sixth light emitting diode 146 is placed between the 12 Vdc power source and the seventh DC to DC converter 147. When the invention 100 is powered either from the national electrical grid 132 or the automobile's electrical system 131, the sixth light emitting diode 146 illuminates indicating the powered situation. The sixth light emitting diode 146 is mounted in the housing 103 such that it is visible.

In the first potential embodiment of the disclosure, the seventh DC to DC converter 147 and the tenth USB port 150 are both provisioned as a single unit using a Drok 12 V to 5V 2 A step down converter. The eighth DC to DC converter 148 and the eleventh USB port 151 are both provisioned as a single unit using a Drok 12 V to 5V 2 A step down converter. The ninth DC to DC converter 149 and the twelfth USB port 152 are both provisioned as a single unit using a Drok 12 V to 5V 2 A step down converter.

To use the invention 100, the invention 100 is plugged into either the national electrical grid 132 or the automobile electrical system 131 and the electronic device is plugged into one of the plurality of USB ports 113 as normal.

Figure 5:
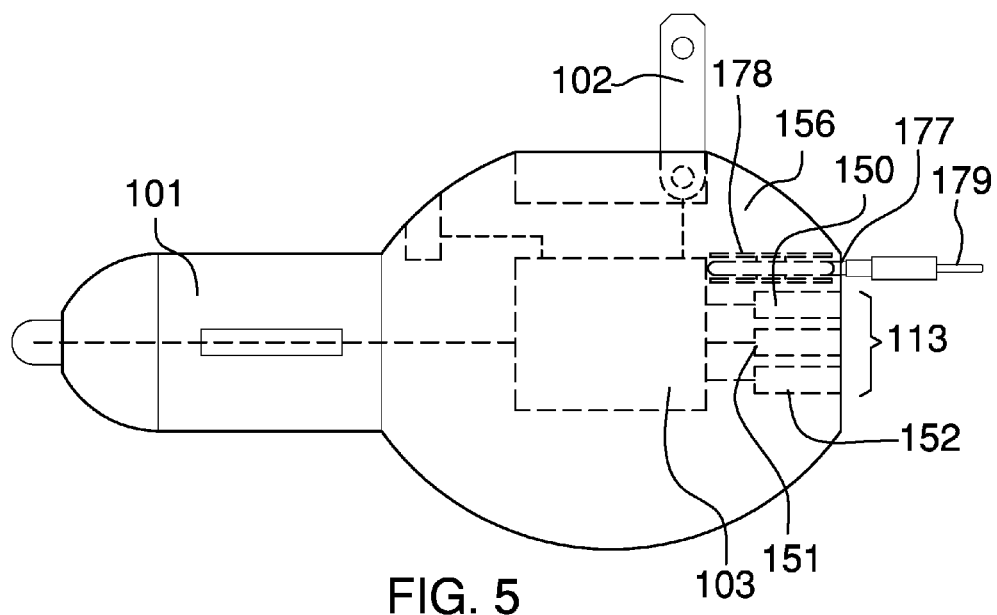
FIG. 5 is a front view of an embodiment of the disclosure.
Figure 6:
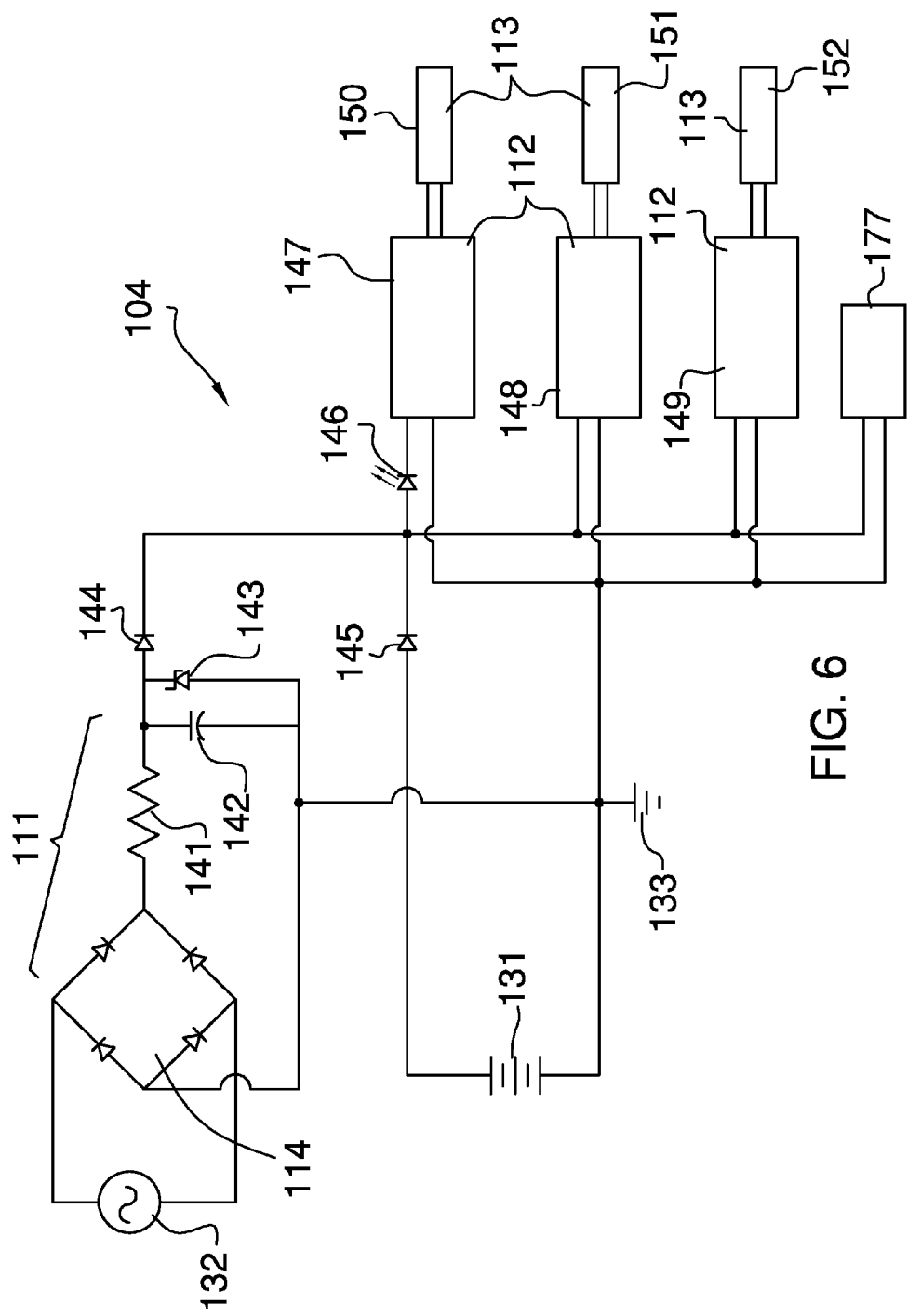
FIG. 6 is a schematic view of an embodiment of the disclosure.

Optionally, the invention 100 may include a phone cord 177 that is adjacent to the plurality of USB ports 113. The phone cord 177 is in wired connection with the charging circuitry 104. Moreover, the phone cord 177 winds on a spring-loaded spindle 178 that is positioned inside of the housing 103. The phone cord 177 is further defined with a phone plug 179 that is provided on a distal end 180 of the phone cord 177. The phone plug 179 of the phone cord 177 is adapted to connect with a cell phone 300. It shall be noted that the term cell phone 300 is being used to include smart phones, tablet computers, and other electronic devices. Referring to FIG. 5, the spring-loaded spindle 178 is responsible for winding up or unwinding the phone cord 177 with respect to the housing 103.

The following definitions were used in this disclosure:

Automobile: As used in this disclosure, an automobile is a road vehicle that is powered by an internal combustion engine.

LED: As used in this disclosure, an LED is an acronym for a light emitting diode. A light emitting diode is a 2 lead semiconductor that is also a light source.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An electric charger comprising:
a car adapter plug, a NEMA 1 plug, a housing, and charging circuitry;
wherein the electric charger is designed to receive electrical power from multiple sources;
wherein the electrical charger is designed to provide electrical power to electronic devices through a plurality of USB ports;
wherein each of the plurality of USB ports provides power at a rated voltage of 5 volts;
wherein each of the plurality of USB ports is designed to allow electronic devices to draw greater than 1990 milliamperes at the rated voltage;
wherein the electric charger is designed to draw power from an automobile electrical system;
wherein the electric charger is designed to draw power from the national electrical grid;
wherein the housing is a rigid casing;
wherein the car adapter plug, the NEMA 1 plug, and the plurality of ports are mounted on the housing;

wherein the charging circuitry is installed within the housing;
wherein the housing is formed in a sixteenth egg shape;
wherein the housing is further defined with a thirteenth end and a fourteenth end;
wherein the housing is further formed with and a fifteenth cavity;
wherein the car adapter plug is positioned at the thirteenth end;
wherein the plurality of USB ports are positioned at the fourteenth end;
wherein the housing is formed to receive the NEMA 1 plug;
wherein the NEMA 1 plug is hinged such that it will fold into and fit within the fifteenth cavity;
wherein the charging circuitry comprises an AC power conditioner, a plurality of DC to DC converters, and the plurality of USB ports;
wherein the AC power conditioner converts power from the national electrical grid to 12 Vdc;
wherein the output of the AC power conditioner is connected to the input from the automobile's electrical system;
wherein the input from the automobile's electrical system is isolated from the output of the AC power conditioner using a fourth diode;
wherein the output from the AC power conditioner is isolated from the input from the automobile's electrical system using a fifth diode;
wherein the AC power conditioner comprises a full wave rectifier, a first resistor, a second capacitor and a third Zener diode;
wherein both 12 Vdc power sources are connected to each of the plurality of DC to DC converters.

2. The electric charger according to claim 1 wherein each of the plurality of DC to DC converters converts 12 Vdc power to 5 Vdc power.

3. The electric charger according to claim 2 wherein each of the plurality of DC to DC converters is used to provide power to each USB port selected from the plurality of USB ports.

4. The electric charger according to claim 3 wherein the plurality of DC to DC converters further comprises a seventh DC to DC converter, an eighth DC to DC converter, and a ninth DC to DC converter.

5. The electric charger according to claim 4 wherein the plurality of USB ports further comprises a tenth USB port, an eleventh USB port, and a twelfth USB port.

6. The electric charger according to claim 5 wherein
the seventh DC to DC converter is used to power the tenth USB port;
wherein the eighth DC to DC converter is used to power the eleventh USB port;
wherein the ninth DC to DC converter is used to power the twelfth USB port.

7. The electric charger according to claim 6 wherein the charging circuit further comprises a sixth light emitting diode; wherein the sixth light emitting diode illuminates when the electric charger is powered from either the national electrical grid or the automobile's electrical system; wherein the sixth light emitting diode is placed between both 12 Vdc power sources and the seventh DC to DC converter.

8. The electric charger according to claim 7 wherein a phone cord is provided adjacent to the plurality of USB ports; wherein the phone cord is in wired connection with the charging circuitry.

9. The electric charger according to claim 8 wherein the phone cord winds on a spring-loaded spindle that is positioned inside of the housing; wherein the phone cord is further defined with a phone plug that is provided on a distal end of the phone cord; wherein the phone plug of the phone cord is adapted to connect with a cell phone.

* * * * *